April 23, 1935.                 J. L. CREVELING                 1,998,752
                                LUBRICATING DEVICE
                             Original Filed Feb. 24, 1932

INVENTOR.
JOHN L. CREVELING
BY
                ATTORNEY

Patented Apr. 23, 1935

1,998,752

UNITED STATES PATENT OFFICE 1,998,752

LUBRICATING DEVICE

John L. Creveling, near Tucson, Ariz., assignor to The Lubrication Corporation, South Bend, Ind., a corporation of Delaware Original application February 24, 1932, Serial No. 594,785. Divided and this application January 15, 1934, Serial No. 706,591

6 Claims. (Cl. 221—47.4)

This invention relates to lubricating devices and more particularly to lubricating pumps of the type employing a pump assembly forming one unit of a lubricant dispensing apparatus or "gun", the lubricant container itself being arranged to provide the other unit, the two units when combined providing a complete and operative lubricant gun.

The very common and usual lubricant hand pump or lubricant hand "gun" comprises a pump and a lubricant reservoir more or less integrally connected with the pump, the reservoir being arranged to be filled by hand or by some instrument in the nature of a paddle or scoop or the like. Such "guns" are generally filled from containers in which the lubricant is supplied in bulk. The objections to such filling methods and instrumentalities are well known.

One of the primary objects of the invention therefore is to provide a lubricant pump unit capable of being associated with an original lubricant container to provide a completely operative lubricant gun of what may be termed a "self loading" type. The lubricant containers may be termed cartridges since they not only provide units necessary to the completion of the gun as a completely operative structure but dispense the lubricant through the gun pump unit directly to the part or parts to be lubricated.

Another object of the invention is to provide a compact and relatively cheap lubricant gun including the pump unit proper and the reservoir or cartridge unit.

Still another object of the invention is to provide an efficient hand operated lubricant pump capable of producing relatively high pressures.

Still other objects, the advantages and uses of the invention and various species thereof should become apparent after reading the following description and claims and after viewing the drawing in which:

This application is a division of my co-pending application Serial #594,785, filed February 24th, 1932, entitled Lubricating devices.

Figure 1:
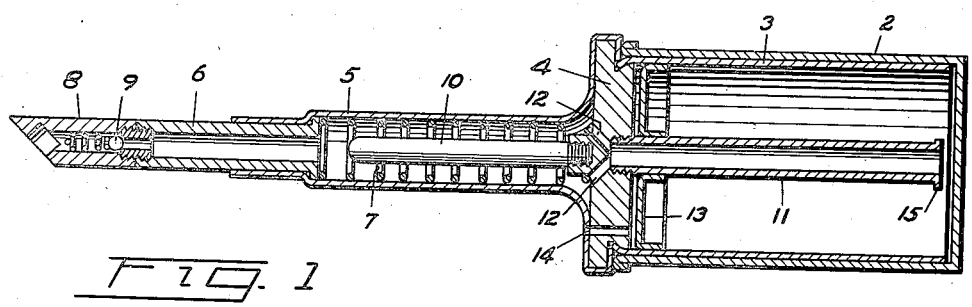
Fig. 1 is a view partly in section and partly in elevation showing one type of lubricating gun including a pump unit and a container or cartridge unit associated together.

The species of Fig. 1 includes an original container or cartridge 2 from which the top has been removed and which is illustrated in its telescoped position with respect to and about a cylinder 3 which is secured to and forms a part of a pump unit. The pump unit includes the cylinder 3 and various other parts hereafter described. The cylinder 3 is secured to a member 4 in any suitable manner such for instance as that illustrated and preferably makes a tight sliding fit with the interior wall of the container or cartridge 2 not only to prevent air and lubricant leakage but also to steady and hold the container.

A casing 5 which may be secured to the member 4 in any suitable manner, serves to house, retain and guide a hollow plunger 6 and also serves to house a spring 7 which at one end may abut against the member 4 and at its other end engages the inner end of the plunger 6 to maintain the same at its outer position, that is, the position illustrated in Fig. 1. To the outer end of the hollow plunger a nozzle 8 may be secured for servicing a lubricant fitting such as that illustrated in Morris Reissue Patent #18,123 and in between the nozzle and the hollow plunger a spring held ball check valve and a valve seat, generally designated 9, may be positioned and secured. Secured to the member 4 in axial alignment with the hollow plunger 6 is a plunger or piston 10 which is adapted to enter the hollow plunger 6 to extrude lubricant therefrom. A tubular member 11 secured at one end centrally of the member 4 provides a conduit for the flow of lubricant from the reservoir to passages 12 formed through the member 4 through which passages the lubricant passes into the casing 5 and thence into the hollow plunger 6. A follower or piston 13 surrounds and slides upon the tubular conduit 11 to follow the lubricant and to prevent air from piercing the same as the lubricant is withdrawn from the reservoir by the pump. A passage 14 may be provided through the member 4 and the casing 5 so that air may pass to and from the space behind the follower 13 while a stop 15 may be provided on the free end of the conduit 11 so as to retain the follower 13 thereon.

In loading and operating this form of lubricant dispensing device or "gun" the cover (not shown) is removed from the container 2 and the container is telescoped over the cylinder 3, this action forcing the lubricant into the space interior of the cylinder 3. Prior to the filling operation, the follower 13 is disposed against the stop 15 so that as the container and cylinder are telescoped together the lubricant forces the follower toward the internal end of the cylinder that is to the position illustrated in Fig. 1. This operation facilitates the elimination of air pockets. As this operation has loaded the gun the gun is ready to be applied to the fitting into which lubricant is to be injected. With the nozzle of the plunger 6 contacting with the fitting and applying pressure upon the rear of the gun in the direction of the fitting the plunger 6 telescopes over the piston or plunger 10 and lubricant trapped within the hollow plunger 6 is forced past the check valve 9 out of the nozzle 8 and into the fitting and bearing. This operation compresses the spring 7 so that when pressure on the rear of the gun is released the spring urges the plunger 6 forwardly and toward its outermost position which action in turn draws lubricant from the reservoir through the conduit 11 passages 12 and casing 5 into the hollow of the plunger 6. The conduit 11 terminates sufficiently short of the bottom of the container 2 to permit lubricant to pass therebetween and as lubricant is withdrawn from the reservoir the follower moves toward the stop 15, air flowing in through the passage 14 to compensate for the lubricant withdrawn. In withdrawing the empty container, can or cartridge, the suction thereby created insures that the follower 13 will be left at the open end of the cylinder 3.

Figure 2:
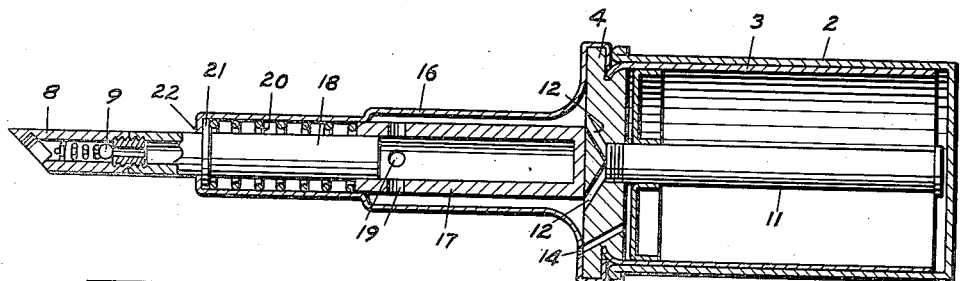
Fig. 2 is a view similar to that of Fig. 1 of another species of a similar type of lubricant gun.

The gun illustrated in Fig. 2 differs from the gun illustrated in Fig. 1 only in the type of pump utilized. In this case the casing 16 is modified to receive a cylinder 17 which is closed at one end and at that end secured to the member 4 and which receives a hollow plunger 18 corresponding to the plunger 6 in its other end. Appropriate inlet openings 19 may be provided in the cylinder 17 adjacent its open end and a spring 20 surrounding the plunger 18 abuts against the open end of the cylinder 17 and against a collar 21 which is secured to the plunger 18 and retained in the casing 16 by an inturned shoulder 22. The operation of this species is very similar to the operation of the species of Fig. 1 and a description thereof is deemed unnecessary.

Figure 3:
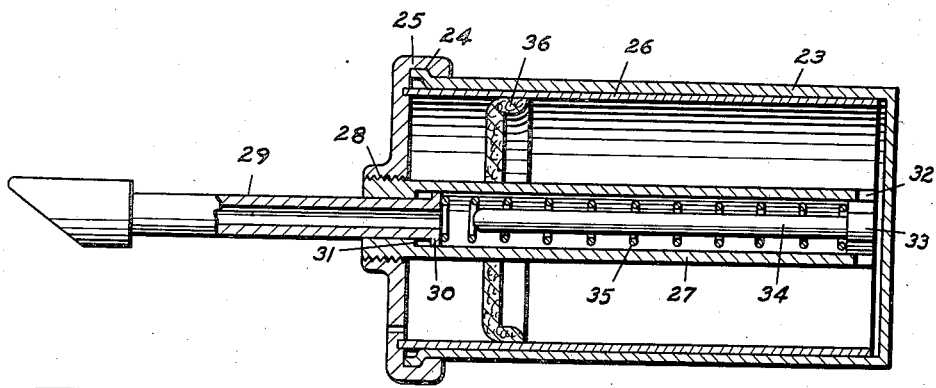
Fig. 3 is a view similar to the views of Figs. 1 and 2, of still another species of the invention.

The type of gun illustrated in Fig. 3 is somewhat similar in so far as the pump construction is concerned with the gun illustrated in Fig. 1 but in this form the gun itself is more compact in that the pump itself telescopes into the lubricant container or cartridge. Then too the cartridge itself has been modified to lock the same to the pump unit. Referring more particularly to Fig. 3 the container or cartridge 23 is provided with bayonet lugs 24 which interlockingly engage in appropriately formed bayonet slots formed in a closure member 25 to which a cylinder 26 may be secured in any appropriate manner. A sleeve 27 threadedly secured as at 28 to the closure 25 provides a cylinder or tubular guide for the hollow plunger 29 which is retained therein by interengagement of a stop 30 with a shoulder 31. The unsecured end of the sleeve 27 may be provided with slots 32 through which lubricant may pass into the interior of the sleeve through appropriate openings formed in a spider 33 also secured in this open end of the sleeve 27. A plunger or piston 34 is secured to the spider 33 in axial alignment with the axis of the hollow plunger 29 and a spring 35 abutting at one end against the spider 33 and at the other end against the flange or stop 30 on the plunger 29 serves to return the latter to its outermost position. A follower 36 of fibrous material such as leather or the like is slidably mounted upon the sleeve 27. The operation of this form being similar to that of the preceding forms, an explanation thereof is deemed unnecessary. It will be noted however that in this form the arrangement is more compact than in the previously described forms.

While I have illustrated and described several forms the invention may assume it should be appreciated that it is susceptible of various other modifications and arrangements for which reason I do not desire to be limited to the details of construction illustrated but only to the spirit of the invention as embraced within the scope of the following claims:

I claim:

1. A lubricating device of the character described comprising, a cylinder adapted to be received telescopically within an original package of lubricant, a rigid member rigidly secured at one side to one end of said cylinder and providing a closure therefor, an original lubricant container telescoped over one end of said cylinder and frictionally secured thereto, said container providing a closure for the other end of said cylinder, a plunger pump of the thrust operating type rigidly but reciprocably secured to the other side of said member, and means for supplying lubricant from said cylinder to said pump including a tube removably secured to said closure member and a follower slidably mounted on said tube, said follower contacting the internal wall of said cylinder.

2. In a lubricating device of the character described comprising, a cylinder adapted to be received telescopically within an original lubricant package, a rigid member rigidly secured to one end of said cylinder and providing a closure therefor, an original lubricant container telescoped over one end of said cylinder and frictionally secured thereto, said container providing a closure for the other end of said cylinder, a high pressure pump casing rigidly secured to the other side of said member, a plunger reciprocably mounted in said casing and retained thereby, said casing providing a passage for lubricant to said plunger, said member having a passageway therethrough communicating with the interior of said casing, a supply tube secured to said member within said cylinder and terminating at a place spaced from said container, said tube communicating with said passage through said member, and a follower slidably mounted upon said tube.

3. In a lubricating pump, a casing, a tubular plunger telescoped within said casing and normally extending outwardly therefrom, a closure for the rear end of said casing formed with a passage communicating with said casing, a solid plunger secured to said closure in line with the bore of said tubular plunger, a spring interposed between said closure and said tubular plunger, a tube secured to and extending rearwardly from said closure and communicating with said passage, and a follower piston surrounding said tube.

4. A lubricating device comprising a container, a cylinder telescoped within said container, a follower within said container, a closure for said container formed with a passage and secured to said cylinder, a casing secured to the forward side of said closure and having a chamber communicating with said passage, a tubular plunger telescoped within said casing and normally extending outwardly from the front end thereof, a solid plunger secured to said closure within said casing in line with the hollow of said tubular plunger, and a spring interposed between said closure and said hollow plunger.

5. A lubricating device comprising a lubricant container, a cylinder telescoped within said container, a closure for said container formed with a passage communicating with said cylinder, a tube secured to said closure and extending rearwardly into said container, a follower surrounding said tube and mounted for sliding movement thereon within said cylinder and said container, a casing secured to said closure and extending outwardly therefrom, a fixed tube positioned within said casing having one end open and the other end closed and forming an outer annular chamber between the outside of the fixed tube and said casing communicating with said passage and forming an inner cylindrical chamber within said tube and having a passage formed intermediate the ends of the tube through which lubricant may pass from said outer chamber to said inner chamber, a tubular plunger having a shoulder and telescoped within the outer end of said fixed tube, and a spring bearing at its rear end upon the front end of the said fixed tube and at its forward end upon the shoulder formed upon said tubular plunger.

6. A lubricating device comprising a lubricant container, a closure for the container formed with a lubricant passageway, a cylinder secured to the closure and telescoped within the container, a tube secured to the closure and communicating with the passage-way in the closure and extending rearwardly from the closure to a point adjacent to the bottom of the container, a follower surrounding the tube and slidably mounted thereon, a small cylinder secured to the forward side of the closure, a tubular plunger formed with a shoulder and telescopically mounted in the small cylinder, and a spring interposed between said shoulder and said small cylinder.

JOHN L. CREVELING.